(12) United States Patent
Stokes et al.

(10) Patent No.: US 10,526,024 B2
(45) Date of Patent: Jan. 7, 2020

(54) POWERED SIDE PANEL SYSTEM

(71) Applicants: Garrett Stokes, De Kalb, TX (US); Todd Pendley, De Kalb, TX (US)

(72) Inventors: Garrett Stokes, De Kalb, TX (US); Todd Pendley, De Kalb, TX (US)

( * ) Notice: Subject to any disclaimer, the term of this patent is extended or adjusted under 35 U.S.C. 154(b) by 53 days.

(21) Appl. No.: 15/984,152

(22) Filed: May 18, 2018

(65) Prior Publication Data
US 2019/0351953 A1 Nov. 21, 2019

(51) Int. Cl.
B60J 5/06 (2006.01)
B62D 33/08 (2006.01)
F15B 15/26 (2006.01)
F15B 15/06 (2006.01)
B62D 63/08 (2006.01)

(52) U.S. Cl.
CPC ............ B62D 33/08 (2013.01); B62D 63/08 (2013.01); F15B 15/06 (2013.01); F15B 15/261 (2013.01)

(58) Field of Classification Search
CPC ................. B29C 66/71; A61M 1/3496; A61M 2205/123; A61M 2205/128; E04B 2/827; B62D 49/0628; A01B 63/1145; A01B 63/145; G07C 5/0816; H01L 2224/48091
See application file for complete search history.

(56) References Cited

U.S. PATENT DOCUMENTS

| | | | | | |
|---|---|---|---|---|---|
| 3,258,884 | A | * | 7/1966 | Wenger | E04H 3/22 52/6 |
| 3,620,564 | A | * | 11/1971 | Wenger | B60P 3/0252 296/83 |
| 4,135,761 | A | * | 1/1979 | Ward | B60R 9/02 29/401.1 |
| 4,232,488 | A | * | 11/1980 | Hanley | B60P 3/0252 108/166 |
| 4,302,044 | A | * | 11/1981 | Sims | B60J 7/141 105/378 |
| 4,489,975 | A | * | 12/1984 | Fredin | B60J 5/0498 105/378 |
| 4,556,248 | A | * | 12/1985 | Kobayashi | B60J 5/0498 296/186.4 |
| 4,682,811 | A | * | 7/1987 | Ooguro | B60J 5/0498 105/378 |
| RE34,468 | E | * | 12/1993 | Rau | E04H 3/24 296/26.02 |
| 5,461,832 | A | * | 10/1995 | Smith | E04B 1/344 52/143 |
| 5,546,709 | A | * | 8/1996 | Decker | E04H 3/28 296/26.07 |
| 6,030,018 | A | * | 2/2000 | Clare | B60J 10/00 224/404 |
| 6,102,468 | A | * | 8/2000 | Lowrey | B60P 3/341 296/169 |

(Continued)

Primary Examiner — Kiran B Patel
(74) Attorney, Agent, or Firm — Law Office of Jeff Williams PLLC; J. Oliver Williams

(57) ABSTRACT

A powered side panel system is used in conjunction with a loading bed found on trailers and other flatbed vehicles. The system includes a side panel having a vertical member. The side panel is configured to pivot about a panel axis in communication with the trailer. A lever arm extends between the side panel and an actuator. The actuator pivots the lever arm about a lever axis. The lever arm contacts the vertical member and controls the rate of radial motion of the side panel about the panel axis. A control unit is configured to regulate the operation of the actuator device.

9 Claims, 6 Drawing Sheets

(56) References Cited

U.S. PATENT DOCUMENTS

| | | | | |
|---|---|---|---|---|
| 6,402,224 B1* | 6/2002 | Monaco | B60J 7/141 | 296/100.06 |
| 6,439,634 B1* | 8/2002 | Jensen | E05B 83/16 | 224/402 |
| 6,644,708 B1* | 11/2003 | Grzegorzewski | B60P 1/43 | 296/10 |
| 6,695,390 B2* | 2/2004 | Bucco Morello | B60J 5/0498 | 160/210 |
| 7,073,816 B1* | 7/2006 | Larson | B62D 63/061 | 280/656 |
| 8,177,278 B1* | 5/2012 | Hurlburt | B60P 1/26 | 296/50 |
| 9,266,460 B2 | 2/2016 | Jung | E04H 3/28 | |
| 9,511,803 B2* | 12/2016 | Wassell | B62D 33/03 | |
| 9,932,078 B1* | 4/2018 | Nehring | B62D 63/061 | |
| 10,246,138 B2* | 4/2019 | Jaradi | E05B 83/22 | |
| 2001/0038218 A1* | 11/2001 | Clare | B60J 10/00 | 296/37.6 |
| 2004/0201249 A1* | 10/2004 | Bush, Sr. | B60J 5/062 | 296/183.1 |
| 2005/0275245 A1* | 12/2005 | Harrison | B62D 33/03 | 296/186.4 |
| 2006/0022489 A1* | 2/2006 | Waldorf | B60J 5/0498 | 296/186.4 |
| 2007/0120397 A1* | 5/2007 | Layfield | B62D 35/001 | 296/180.4 |
| 2007/0278823 A1* | 12/2007 | Hori | B60J 5/0498 | 296/186.4 |
| 2008/0238141 A1* | 10/2008 | Aghajanian | B60R 9/06 | 296/186.4 |
| 2009/0134664 A1* | 5/2009 | Theener | B60J 5/0498 | 296/183.2 |
| 2010/0109381 A1* | 5/2010 | Plavetich | B60R 9/00 | 296/193.01 |
| 2010/0127523 A1* | 5/2010 | Boutin | B60J 5/0498 | 296/10 |
| 2011/0299970 A1* | 12/2011 | Hathaway | B60J 7/1614 | 414/809 |
| 2012/0193942 A1* | 8/2012 | Nye | B62D 33/027 | 296/191 |
| 2018/0050739 A1* | 2/2018 | Maertens | E05F 15/63 | |
| 2019/0174709 A1* | 6/2019 | Niemela | A01K 1/0035 | |

* cited by examiner

POWERED SIDE PANEL SYSTEM

BACKGROUND

1. Field of the Invention

The present application relates to a trailer for the transportation of goods, and more particularly to a pneumatic side gate system to raise and lower sides of the trailer through a powered device.

2. Description of Related Art

The need to transport goods on roadways is important for the benefit of society. The Department of Transportation is tasked with the regulation of vehicles and trailers that are used to carry and haul goods on roadways. Various laws are passed and enforced in an effort to ensure loads are transported safely. Other government agencies are utilized on both state and local levels to ensure safety for those working to transport these loads of goods.

Different types of trailers are used to carry goods. One common type of trailer is a flatbed trailer because it allows for the simplest loading practices. Because there are no sides, a forklift may be used to carry goods to the trailer and load it from any side. The lack of sides on these trailers tends to make transportation of the goods a little more complex in that the load must be securely tied down to prevent spills. Some trailers are made to accommodate temporary side panels that engage a side rail on the trailer. Commonly these are made from either wood or light weight metal components for inserting into the side rail. These must be manually removed and inserted onto the trailer during loading.

A disadvantage of some of these side panels is that they encroach ever so slightly into the trailer bed and take usable space for hauling goods. For various reasons, such as efficiency and time, it is desirable to carry as much as possible in a single haul of goods. There exists certain regulations which stipulate the maximum width of a vehicle or trailer that can traverse the public roadways. Temporary side panels are made to stay within the maximum width by consuming internal bed space. Another disadvantage of these temporary side panels is that they are cumbersome and very difficult to store. The size and weight of these side panels can lead to injury when handling. Additionally, it typically takes multiple people to lift, or the use of machinery.

Although strides have been made to provide a removable side to a trailer for the transportation of goods, shortcomings remain. It is desired that an assembly be provided that removes the hazards associated with manually lifting a side panel. Additionally, it is desired to provide a side trailer panel that is raised and lowered via a powered device attached to the trailer so as to not need additional machinery outside the trailer to operate.

SUMMARY OF THE INVENTION

It is an object of the present application to provide a powered side panel system for a trailer to be used in the transportation of goods. The powered side panel system is used in conjunction with a loading bed found on trailers and other flatbed vehicles. The system includes a side panel having a vertical member. The side panel configured to pivot about a panel axis in communication with the trailer. A lever arm extends between the side panel and an actuator. The actuator pivots the lever arm about a lever axis. The lever arm contacts the vertical member and controls the rate of radial motion of the side panel about the panel axis. A control unit is configured to regulate the operation of the actuator device.

It is an object of the present system to provide a positionable side panel on a trailer or loading bed that is designed to rest inside the overall width of the trailer/loading bed when raised, such that the side panel system does not increase the overall width of the trailer/loading bed as a whole.

It is another object of the present application to include a powered side panel system that is configured to run off power provided by a vehicle (i.e. truck). It is desired that the system may be configured to run off of hydraulics or pressurized air from the vehicle.

Another object of the present system is to maximize the usability of the trailer/loading bed by locating the actuator and the lever arm primarily beneath the trailer/loading bed. Additionally, a feature may include the linking of multiple side panels together for control via a single control unit to allow simultaneous operation. Ultimately the invention may take many embodiments as seen below. In this way, this system overcomes the disadvantages inherent in the prior art.

The more important features of the system have thus been outlined in order that the more detailed description that follows may be better understood and to ensure that the present contribution to the art is appreciated. Additional features of the system will be described hereinafter and will form the subject matter of the claims that follow.

Many objects of the present system will appear from the following description and appended claims, reference being made to the accompanying drawings forming a part of this specification wherein like reference characters designate corresponding parts in the several views.

Before explaining at least one embodiment of the system in detail, it is to be understood that the system is not limited in its application to the details of construction and the arrangements of the components set forth in the following description or illustrated in the drawings. The system is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
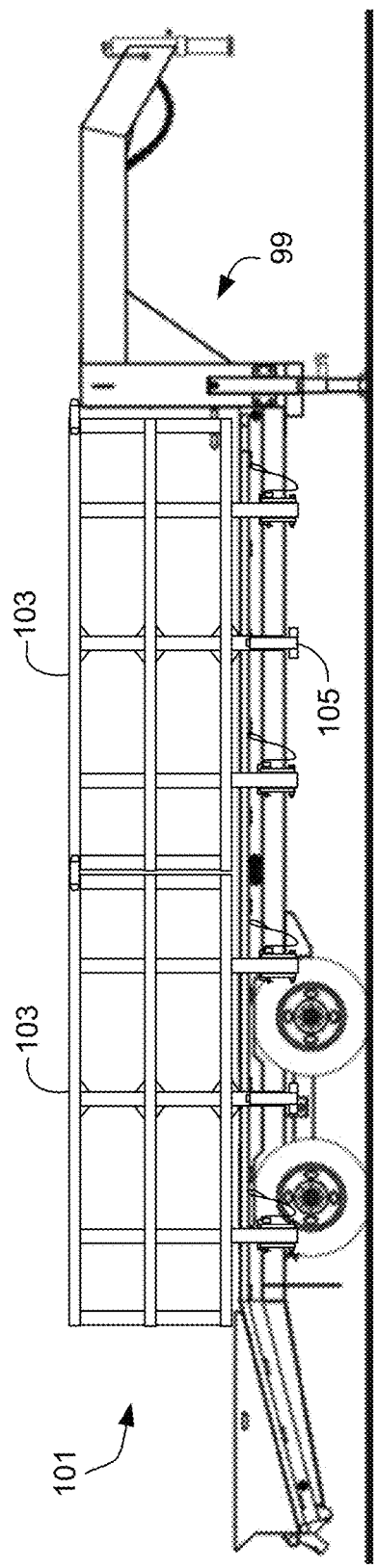
FIG. 1 is a side view of a powered side panel system according to an embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the system described herein may be oriented in any desired direction.

The system and method in accordance with the present application overcomes one or more of the above-discussed problems commonly associated with manually operated side panels discussed previously. In particular, the system provides a powered device for operation of a side panel for use in the transportation of goods. The system provides a positionable side panel on a trailer or loading bed that is designed to rest inside the overall width of the trailer/loading bed when raised so as to conform with local and national regulations on vehicle/trailer width. The side panel may be selectively lowered to facilitate ease of loading and then raised to secure the loaded contents. The system is configured to run off power provided by a vehicle (i.e. truck), such as hydraulics or pressurized air from the vehicle. Furthermore, a large portion of the system is stored underneath the trailer in operable condition. Multiple side panels may be linked together for control via a single control unit to allow simultaneous operation. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system and method of the present application is illustrated in the associated drawings. The system includes a side panel having at least one vertical member wherein the side panel is configured to pivot about a panel axis. A lever arm is included and is pivotally coupled to a trailer. The lever arm pivots about a lever axis and is moved by the use of an actuator. The actuator extends between the trailer and the lever arm to cause rotation of the lever arm and thereby raise and lower the side panel. A control unit is in communication with the actuator to allow operative control to a user. The actuator may be powered through existing vehicle systems. Additional features and functions of the system are illustrated and discussed below.

Referring now to the Figures wherein like reference characters identify corresponding or similar elements in form and function throughout the several views. The following Figures describe the system of the present application and its associated features. With reference now to the Figures, an embodiment of the powered side panel system and method of use are herein described. It should be noted that the articles "a", "an", and "the", as used in this specification, include plural referents unless the content clearly dictates otherwise.

Figure 2B:
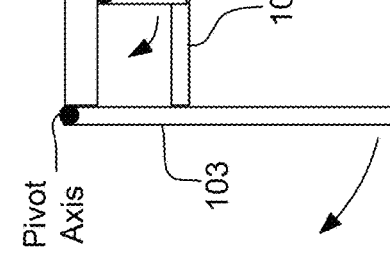
FIGS. 2A-2B are exemplary rear views of the powered side panel system in FIG. 1 illustrating the movement of the side panels.

Referring now to FIGS. 1-2B in the drawings, a perspective view and an exemplary rear view of a powered side panel system 101 is illustrated. System 101 is designed to integrate within an existing loading bed, such as a flatbed trailer or flatbed on the back of a truck. It is designed to permit a user to selectively raise and lower side panels 103 so as to permit workers room to easily load and unload the loading bed. As seen in FIG. 1, the loading bed is shown as a trailer 99. A lever arm 105 is configured to mount underneath the trailer flatbed and reach around the side of the trailer to rotate the side panel 103 into and out of position. One or more lever arms 105 are used.

Figure 2A:
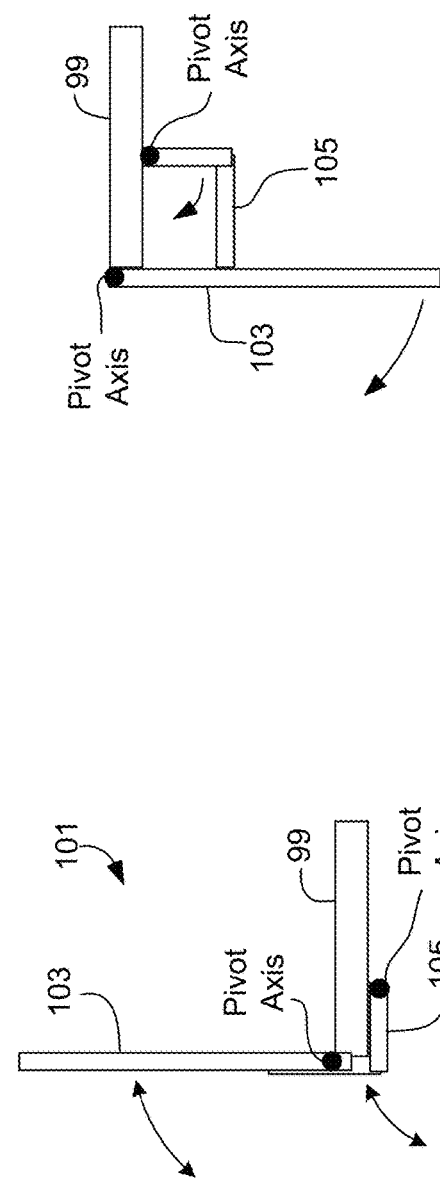

In FIGS. 2A and 2B, rear views of system 101 is depicted in a simplified form to show the general movement of the side panels. As seen in the Figures, the side panels extend between a raised position (FIG. 2A) and a lowered position (FIG. 2B). When lowered, access is provided to workers for loading and unloading the trailer. When raised, the side panels act to secure the loaded contents on the trailer. Depending on the overall height of the side panels, the side panels may hang from the trailer downward as shown in FIG. 2B. In embodiments where the height of the side panels exceeds the relative height of the loading bed from the ground, the side panels may rest more horizontally.

Figure 3:
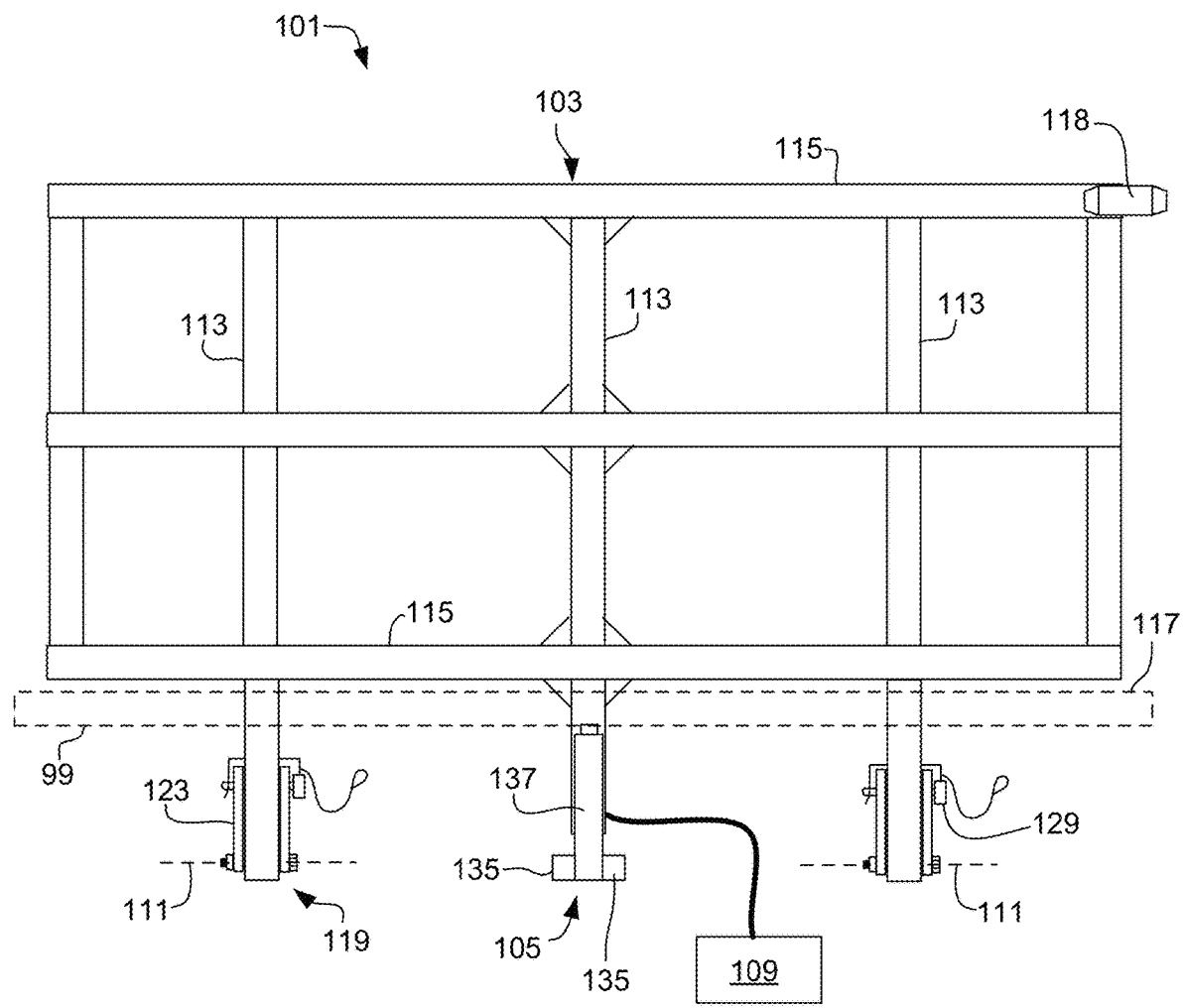
FIG. 3 is a side view of the powered side panel system of FIG. 1.

Referring now also to FIG. 3 in the drawings, a side view of a powered side panel system is illustrated. System 101 includes a side panel 103, a lever arm 105, an actuator 107 (see FIGS. 8-12), and a control unit 109. Panel 103 is configured to pivot about a panel axis 111 between an elevated or raised position to a lowered position. Panel 103 includes one or more vertical members 113 and horizontal members 115 that are selectively coupled to form a barrier or wall of sorts. One or more vertical members 113 extend below the trailer loading surface 117. To facilitate the rotation of panel 103 between its positions relative to trailer 99, it pivots about panel axis 111. Axis 111 is located below loading surface 117. A bracket assembly 119 is used to facilitate rotation.

Figure 4:
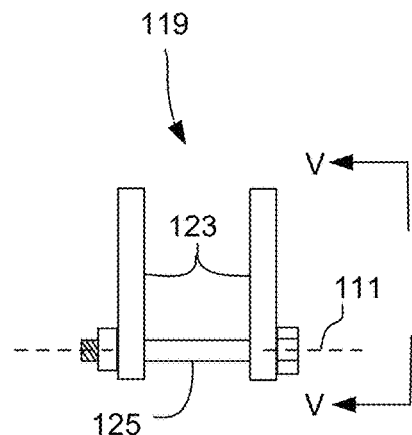
FIG. 4 is a side view of a panel bracket in a side panel of the powered side panel system of FIG. 3.
Figure 5:
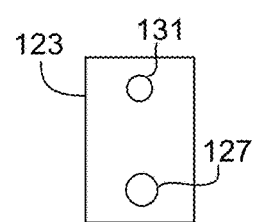
FIG. 5 is a front view of the panel bracket of FIG. 1.
Figure 6:
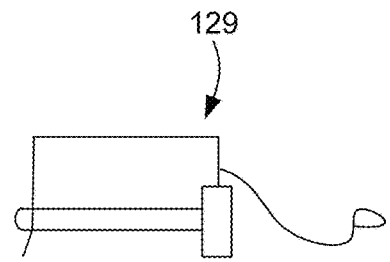
FIG. 6 is a side view of a locking pin in the powered side panel system of FIG. 3.

Referring now also to FIGS. 4-6 in the drawings, views of bracket assembly 119 are provided. In FIG. 4, bracket 121 is shown as having two arms 123 that cover opposing sides of vertical arm 113. A fastener 125 is passed through vertical member 113 as well as an aperture 127 in both arms 123 so as to define panel axis 111. FIG. 5 illustrates a front view of one of the arms 123. Bracket assembly 119 also includes a locking pin 129 (see FIG. 6) configured to pass through vertical member 113 and apertures 131 in arms 123. Pin 129 is configured to secure panel 103 in an elevated position independent of the operation of actuator 107. Power may be deactivated from actuator 107 when panel 103 is raised and locking pin 129 will ensure panel 103 remains in the elevated position.

Referring back to FIG. 3 in the drawings, control unit 109 is configured to provide a user interface for activation of system 101. Control unit 109 is powered by a power supply which may be provided through a vehicle power system, a battery, solar power, and other forms, such as the power grid. Control unit 109 is configured to activate actuator 107 so as to through a rod so as to induce movement of lever arm 105. Side panel 103 may also include tab 118 extending outward from the framed perimeter of members 113/115. Tab 118 is useful to couple neighboring panels 103 together.

Figure 7:
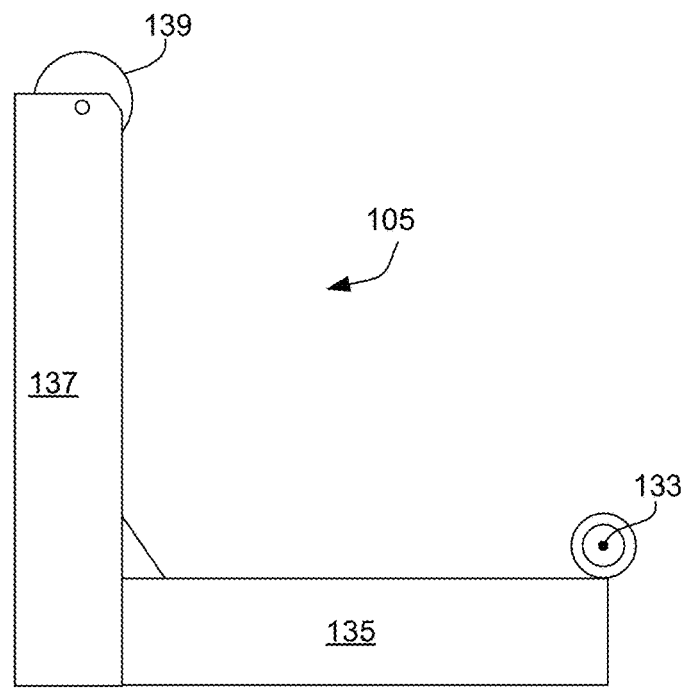
FIG. 7 is a front view of a lever arm in the powered side panel system of FIG. 3.
Figure 8:
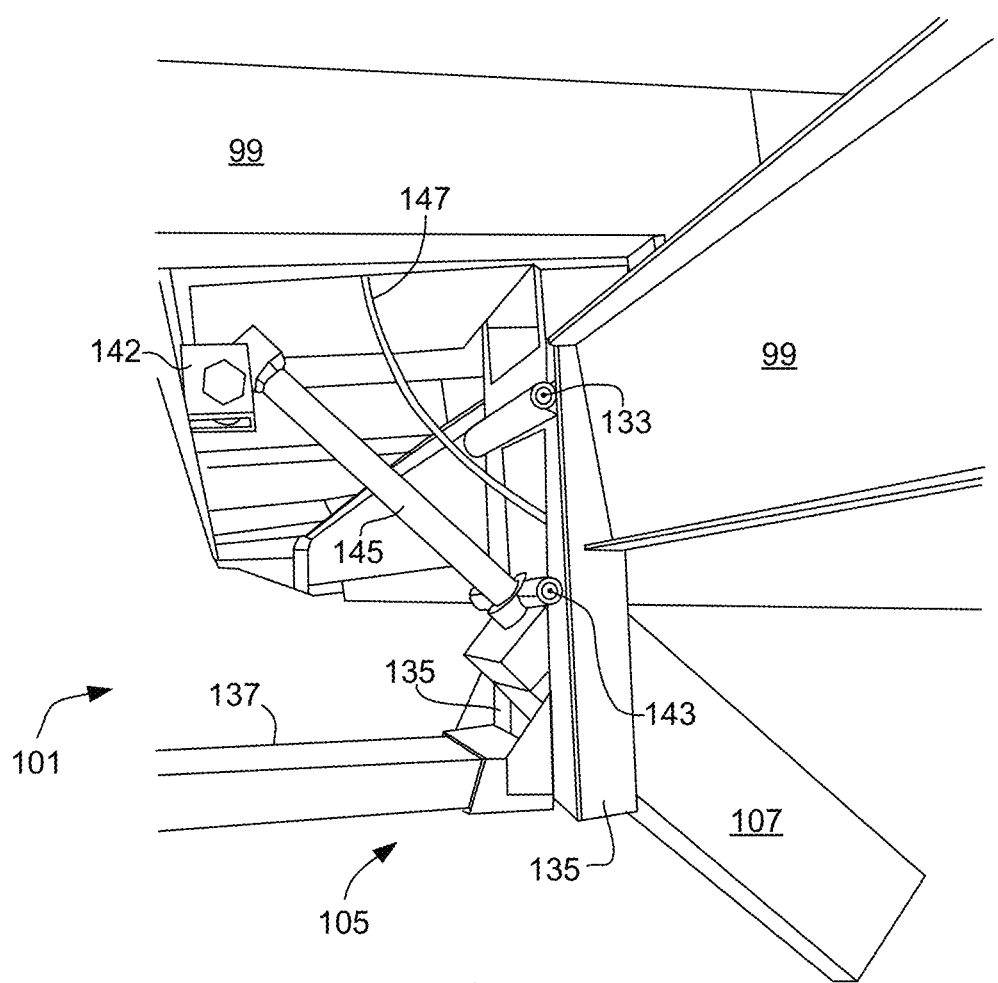
FIG. 8 is a perspective view of the powered side panel system of FIG. 3 beneath a loading bed.
Figure 10:
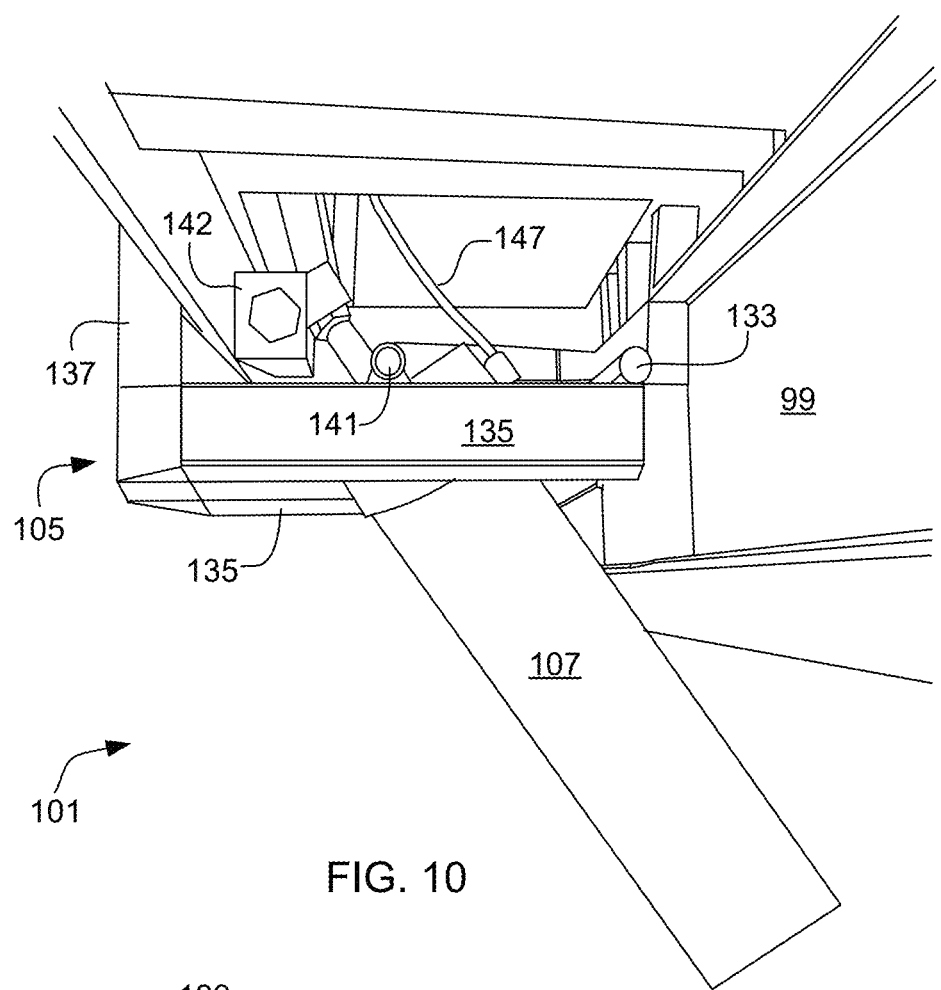
FIG. 10 is an alternate perspective view of the powered side panel system of FIG. 3 beneath the loading bed.

Referring now also to FIG. 7 in the drawings, a front view of lever arm 105 is illustrated. Lever arm 105 is configured to act as the interface between actuator 107 and panel 103. Lever arm 105 is coupled to a lower portion of trailer 99 in a hinged manner so as to pivot about a lever axis 133. Lever arm 105 includes a lower set of horizontal arms 135 and a vertical arm 137. Only a single horizontal arm 135 is seen in FIG. 7. Both arms 135 are seen in FIGS. 8 and 10. Vertical arm 137 extends upward at the end of arms 135 and is located so as to be between them wherein arm 137 is centered in the void space between arms 135. At a distal end of arm 137 is a roller 139. Roller 139 is configured to contact against an outer surface of vertical member 113 of panel 103. Roller 139 is designed to minimize resistance as lever arm 105 pivots about a different axial location than panel 103.

During the course of operation for panel 103, roller 139 will traverse along its surface some distance. The distance depends upon the length of arms 135/137 and the location of axis 111/133. It should be noted that the terms "vertical" and "horizontal" in defining arms 135/137 are not meant to be limiting but rather are used in reference to its relative positioning when panel 103 is fully raised.

Figure 9:
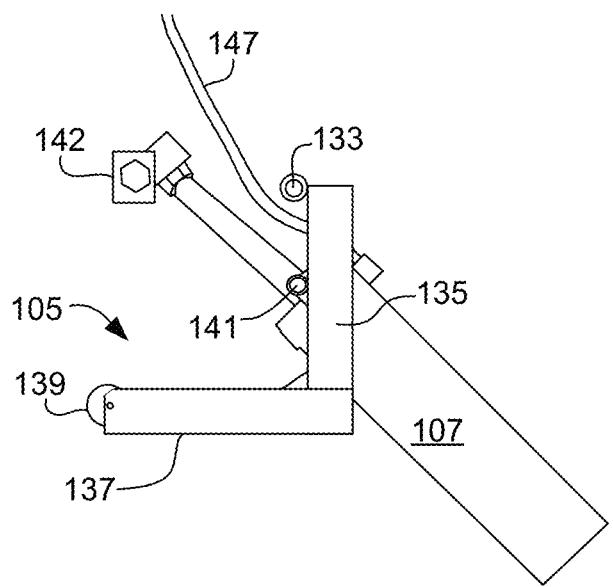
FIG. 9 is a front view of the lever arm and actuator in the powered side panel system of FIG. 8.

Referring now also to FIGS. 8 and 9 in the drawings. In FIG. 8, a lower perspective view of system 101 is illustrated wherein most of panel 103 is removed. The purpose of FIG. 8 is to depict a view of system 101 underneath trailer 99 and to provide an enlarged view of actuator 107 and lever arm 105. Actuator 107 is configured to actuate or pivot lever arm 105. In FIG. 8, lever arm 105 is lowered. In this position, panel 103 would also be lowered. Vertical arm 137 is shown in a horizontal position beneath trailer 99. Actuator 107 is pivotally coupled between 2 locations, namely the trailer 99 and lever arm 105. Actuator 107 includes a mount 142 directly coupled to a portion of trailer 99 beneath loading surface 117. Actuator 107 is also pivotally coupled to horizontal arm 135 via a pin 141. Pin 141 defines actuator axis 143 and may be located above or below the arm 135.

Actuator 107 further includes a rod 145 which is hingedly coupled to mount 142. In operation, rod 145 is extended and retracted. As seen in FIG. 8, when rod 145 is extended, lever arm 105 is lowered. Due to the different axis locations in system 101, actuator 107 will typically change its alignment relative to lever arm 105 during operation. Actuator 107 passes through or between arms 135. As seen in FIG. 9, a simplified front view of actuator 107 and lever arm 105 is provided. Of note is that hose 147 extends from actuator 107 to a reservoir and is configured to carry a liquid (hydraulics) or a gas (pneumatics) that may be pressurized to activate the movement of rod 145. Hose 147 may be routed through control unit 109 to regulate pressures within hose 147. Alternatively, control unit 109 may be in electrical communication via wires with actuator 107 only.

Figure 11:
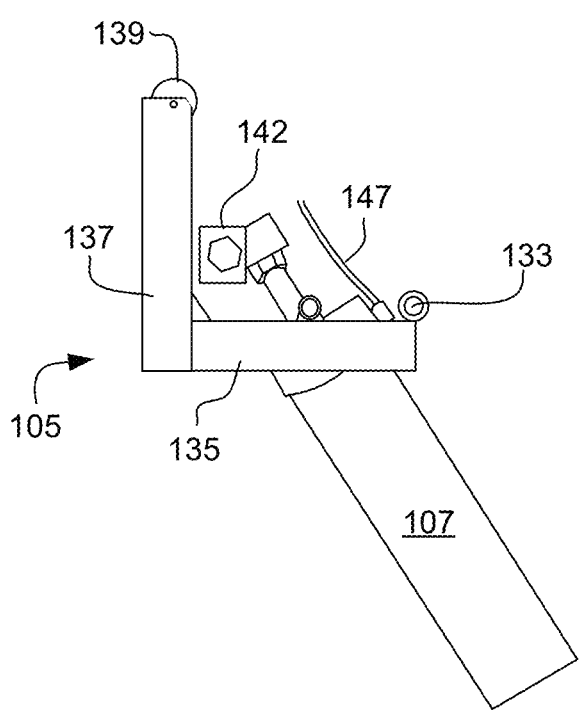
FIG. 11 is a front view of the lever arm and actuator in the powered side panel system of FIG. 10.

Referring now also to FIGS. 10 and 11 in the drawings, a lower perspective view and a front view of a portion of system 101 is provided. In the Figures, actuator 107 is retracted wherein rod 145 is withdrawn. In this figure, lever arm 105 is seen rotated such that arm 137 is vertical and arms 135 are horizontal. Arms 135 remain predominantly underneath the trailer 99 even when rod 145 is in the retracted position. By only having vertical arm 137 extend outside and above the loading bed, excess width is minimalized. It is understood that a portion of the side rail of trailer 99 may be notched out to allow panel 103 and/or vertical arm 137 to be in a raised position and not add to the overall width of trailer 99. This helps to keep the system operable in accordance with department of transportation regulations related to the overall width of vehicles and trailers on public roads. FIG. 11 shows a front view of actuator 107 and lever arm 105 with rod 145 in a retracted position.

When a pressure is applied to actuator 107, rod 145 extends in length. As the pressure is removed, rod 145 retracts in length. As configured, actuator 107 is designed to be under pressure when panel 103 is lowered. This means that pressure is not required to be constantly applied to system 101 to maintain panels 103 in a raised position. During over the road transportation, it is ideal if the pressure/power may be shut off from system 101. Locking pin 129 is useful to hold panel 103 in an elevated position while actuator 107 is "turned off". This helps to conserve energy especially if system 101 is powered through the vehicle.

Figure 12:
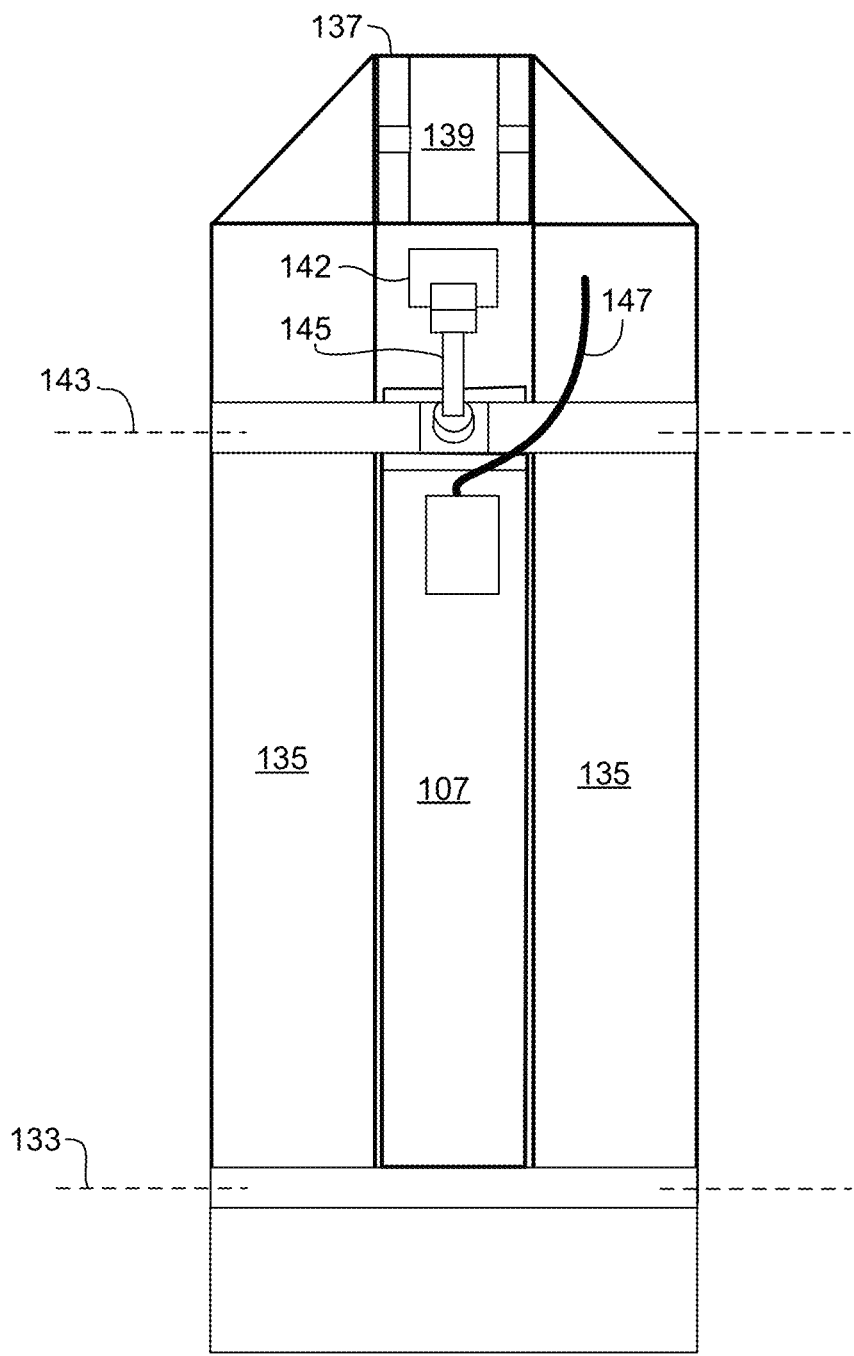
FIG. 12 is an upper view of the actuator and lever arm of FIG. 11.

Referring now also to FIG. 12 in the drawings, an upper view of actuator 107 and lever arm 105 is provided as seen in FIG. 11.

It should be noted that system 101 may include one or more actuators 107 and/or lever arms 105. Additionally, where more than one actuator 107 is used (as seen in FIG. 1), each system may be set up to be controlled through a single control unit 109. Each panel 103 may then be operable independently and or simultaneously with another panel 103. Furthermore, lever arm 105 and mount 142 have been described and depicted as coupling to a portion of the frame of trailer 99. It is understood that other embodiments may elect to avoid contact with the frame directly and may choose to attach system 101 to an underside of the loading bed. The location point of lever arm 105 and mount 142 may share a common structure part of system 101. The shared structure members would assist in simplifying install and minimize metallurgical effects to the trailer 99.

The current application has many advantages over the prior art including at least the following: (1) powered side panels to minimize hazards through manual operation; (2) linking capability to operate systems simultaneously; (3) safe, fast, and easy to operate; and (4) able to retrofit into existing trailers and vehicles.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A powered side panel system for a trailer, comprising:
 a trailer;
 a side panel having a vertical member, the side panel pivotally coupled to the trailer;
 a lever arm pivotally coupled to the trailer, the lever arm contacting the vertical member;
 an actuator device pivotally coupled to both the trailer and the lever arm and is configured to operate between a retracted position and an extended position, movement of the actuator is configured to raise and lower the lever arm which in turn lifts and lowers the side panel; and
 a control unit configured to regulate the operation of the actuator device.

2. The system of claim 1, wherein the side panel is located within the width of the trailer when raised.

3. The system of claim 1, wherein the width of the trailer is unchanged when the side panel is raised.

4. The system of claim 1, wherein the side panel is raised when the actuator device is in the retracted position.

5. The system of claim 1, wherein the side panel is lowered below the trailer when the actuator device is in the extended position.

6. The system of claim 1, wherein the actuator device is powered via pressurized air.

7. The system of claim 1, wherein the actuator device is powered via hydraulics.

8. The system of claim 1, further comprising:
 a locking pin configured to secure the side panel in a particular position independent of the operation of the actuator device.

9. The system of claim 1, wherein the pivot axis of the lever arm is beneath the trailer.

* * * * *